(12) United States Patent
Barthelet et al.

(10) Patent No.: US 7,306,157 B2
(45) Date of Patent: Dec. 11, 2007

(54) COMMUNICATION TERMINAL COMPRISING A CUSTOMIZABLE FRONT FACE

(75) Inventors: Philippe Barthelet, Eragny (FR); Gilles Durand, Eragny (FR); Jean-Philippe Robin, Paris (FR)

(73) Assignee: TCL & Alcatel Mobile Phones Limited, Hong Kong (CN)

( * ) Notice: Subject to any disclaimer, the term of this patent is extended or adjusted under 35 U.S.C. 154(b) by 178 days.

(21) Appl. No.: 11/013,209

(22) Filed: Dec. 14, 2004

(65) Prior Publication Data
US 2005/0184158 A1    Aug. 25, 2005

(30) Foreign Application Priority Data
Dec. 15, 2003    (FR) .................................. 03 14758

(51) Int. Cl.
*G06K 7/10* (2006.01)
(52) U.S. Cl. .............. 235/472.01; 455/550.1; 455/575.1; 455/575.8; 361/680
(58) Field of Classification Search ........... 235/472.01; 340/825.72; 455/575.1, 550.1, 575.4, 575.8, 455/347, 90.3; 348/734; 361/680
See application file for complete search history.

(56) References Cited

U.S. PATENT DOCUMENTS

| | | | | |
|---|---|---|---|---|
| 4,890,832 A | * | 1/1990 | Komaki | 463/44 |
| 5,235,328 A | * | 8/1993 | Kurita | 340/825.72 |
| 5,353,016 A | * | 10/1994 | Kurita et al. | 340/825.22 |
| 5,422,783 A | * | 6/1995 | Darbee | 361/680 |
| 5,848,152 A | | 12/1998 | Slipy et al. | 379/433 |
| D494,969 S | * | 8/2004 | Lin | D14/356 |
| 2001/0024945 A1 | | 9/2001 | Inomata et al. | 455/90 |
| 2003/0211835 A1 | | 11/2003 | Pan et al. | 455/90.3 |

FOREIGN PATENT DOCUMENTS

JP    11041334    12/1999 .................... 1/23

OTHER PUBLICATIONS

French Search Report dated Jul. 28, 2004.

\* cited by examiner

*Primary Examiner*—Daniel Hess
(74) *Attorney, Agent, or Firm*—Morgan, Lewis & Bockius LLP

(57) ABSTRACT

The present invention relates to an electronic device comprising a casing containing a printed circuit (50) and comprising a front face (10) and a rear face (20), and a removable keypad module (40) electrically connected to the printed circuit (50).

According to the invention, the device further comprises a removable clip (60) that encloses the perimeter of the keypad module (40) in order to lock the keypad module to said front face (10).

9 Claims, 4 Drawing Sheets

COMMUNICATION TERMINAL COMPRISING A CUSTOMIZABLE FRONT FACE

RELATED APPLICATION

This application is related to and claims the benefit of priority from French Patent Application No. 03 14758, filed on Dec. 15, 2003, the entirety of which is incorporated herein by reference.

The present invention relates to an electronic device with a customizable keypad.

Non-exclusive fields of application of the invention are mobile or fixed communication terminals or video game consoles, for example.

An electronic device of this type comprises a man-machine interface including a keypad and a display screen.

The keypad and the display screen are generally on the front face of the device.

The keypad and the display screen are connected directly to an underlying printed circuit.

Users of this type of device, for example a communication terminal, increasingly wish to customize their terminal.

One of the key elements of customization is the keypad. It is therefore particularly beneficial to enable the user to change the keypad as easily as possible.

The keypad of a terminal is generally attached to the front face of the terminal.

Accordingly, to change the keypad, the user must change the whole of the front face of the terminal and thus uncover the printed circuit before clipping on another front face to customize his terminal.

This can cause malfunctions associated with dust on the printed circuit.

Moreover, for the same terminal, the key membrane must remain identical from one front face to another.

There will be incompatibility with the printed circuit if a front face is fitted with a keypad whose keys are not disposed in the same way as the keys of the original keypad:

The printed circuit, being wired to receive keys with a given disposition, is not able to make connections to a keypad whose keys have some other disposition.

The document WO 02 37907 proposes a removable computer keyboard. The keyboard comprises an integrated connector grouping all of the connections to the keys constituting the keyboard. When the user of the computer fits a keyboard, for example one with Roman characters, to the body of the computer, the connector integrated into the keyboard is connected to a connector on the body of the computer. Accordingly, when the user enters information on the keyboard, the computer receives the information. Thanks to the integrated connector, the user may use a different keyboard with Arabic characters.

However, the fixing of the keyboard to the computer is not very reliable, as it uses a simple hook, and the keyboard may very easily become disconnected from the body of the computer.

The fixing of the keyboard does not allow the computer to be used in positions other than placed on a horizontal surface without risk of disconnection of the keyboard.

The unreliable fixing of the keypad to the body of the device may become critical in the case of applications to a small electronic device, for example a mobile terminal, that has to be usable in diverse positions, in particular in a vertical plane, or with the keypad facing downward.

An object of the invention is to offer a solution to the above problems and to provide an electronic device with a customizable keypad that is fixed more reliably.

To this end, the invention provides an electronic device comprising:

a casing containing a printed circuit and comprising a front face and a rear face, and a removable keypad module electrically connected to the printed circuit, which device is characterized in that it further comprises a removable clip that encloses the perimeter of the keypad module in order to lock the keypad module to said front face.

Accordingly, the keypad is securely locked to the electronic device, which may be used in any position, and when the keypad is detached from the electronic device the printed circuit of the device is not uncovered and there is no risk of it being damaged.

In one embodiment of the invention, the keypad module comprises a tab providing the electrical connection of the keypad module to the printed circuit of the electronic device, which itself has an electrical connector.

Accordingly, different keypads with different dispositions of the keys may be fitted to the same device.

In another embodiment of the invention the keypad module comprises a dedicated printed circuit and keys connected to the dedicated printed circuit of the keypad module.

The invention also provides a keypad module adapted to be fitted to the above electronic device and including a dedicated printed circuit, keys connected to the dedicated printed circuit, and a tab for making the electrical connection from the keypad module to the printed circuit and securing the keypad module to the front face of the electronic device.

Other features and advantages of the invention will become apparent on reading the following description of one particular embodiment of the invention in which the device is a communication terminal, which description is given by way of illustrative and non-limiting example, and from the drawings listed below.

In the remainder of the description, the invention is explained in its application to communication terminals.

It applies more generally to all types of electronic devices having a man-machine interface comprising a keypad.

A communication terminal according to the invention may be a GSM (Global System for Mobile communications), DCS (Digital Communication System) or UMTS (Universal Mobile Telecommunications System) cellular telephone, a radio transceiver such as a radio paging device, for example, a personal digital assistant (PDA), or a DECT (Digital European Cordless Telecommunications) telephone.

Figure 1:
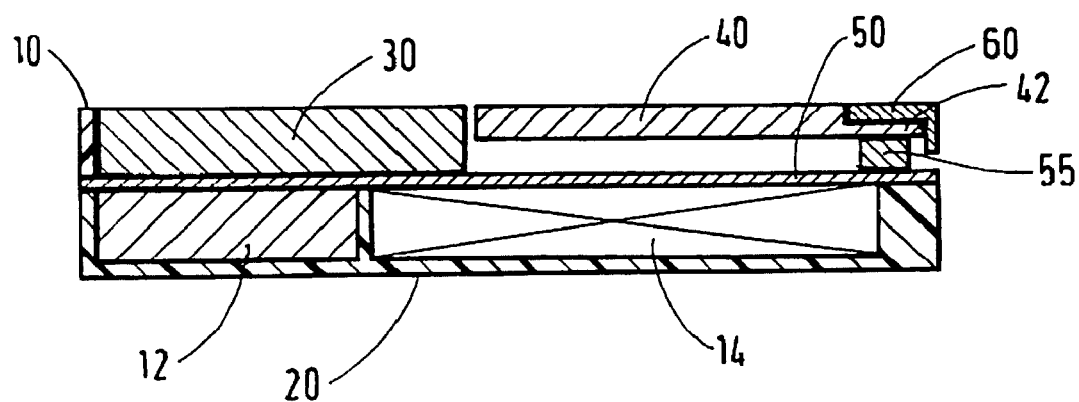
FIG. 1 shows a terminal of the invention in longitudinal section taken along the median axis of the terminal.

FIG. 1 shows a terminal of the invention in longitudinal section taken along the median axis of the terminal.

The casing of the terminal comprises two faces: a front face 10 and a rear face 20.

Under the rear face 20, inside the casing, are mainly the antenna 12 and the battery 14.

Under the front face 10 are a display module 30 and a keypad module 40.

These various components of the terminal are connected to a printed circuit 50.

This printed circuit 50 is substantially parallel to the front face 10 and the rear face 20 of the casing of the terminal and extends over the whole of the interior surface of the terminal.

The display module 30 is connected directly to the printed circuit 50.

The keypad module 40 is connected to the printed circuit 50 via a connector 55 comprising connecting terminals that are brought into corresponding relationship with connecting terminals on the keypad module 40 when the user of the terminal fits the keypad module 40 to the terminal.

The components and functions of the keypad module 40 are described in more detail hereinafter.

Figure 2:
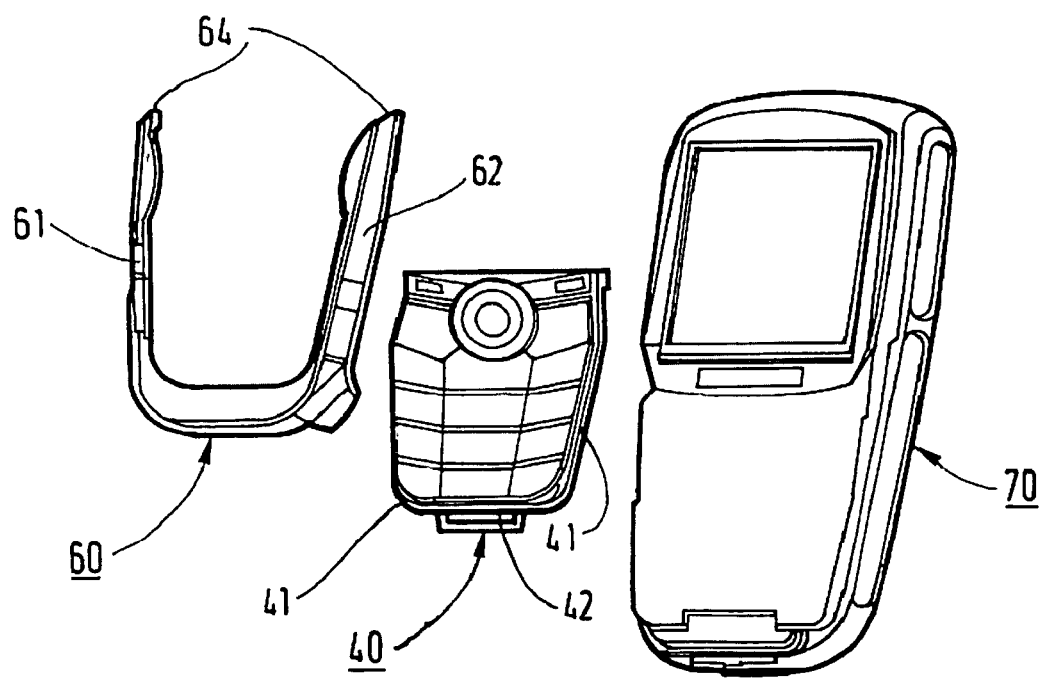
FIG. 2 is an exploded view of the terminal of the invention.

Finally, a substantially U-shaped clip 60 shown in the FIG. 2 exploded view and having two lateral branches 61 and 62 and a base 63 encloses the keypad module 40 at its perimeter in order to lock it to the terminal. In this embodiment, the three sides of the removable clip enclose the keypad module on three sides, which provides very secure fixing of the keypad.

If the user of the terminal requires to remove the keypad module 40, he unlocks the keypad module 40 after first removing the clip 60.

The substantially U-shaped clip 60 may comprise lugs 64 located near the free end of each of its branches 61 and 62, for example. These lugs 64 fix the clip 60 to the terminal. They locate in notches provided for this purpose on the terminal.

In a different embodiment, the substantially U-shaped clip 60 may comprise branches 61 and 62 made from a material that is more elastic than that of the base.

Thus the clip 60, when it is not fitted around the keypad module 40, comprises two converging branches 61 and 62 situated in a common plane that is also common to the base 63.

By virtue of the two branches 60 and 61 spreading apart, the clip 60 forcibly encloses the perimeter of the keypad module 40 in order to lock the module to the terminal.

The clip 60 could equally be of open substantially rectangular shape, and would then have three sides conferring on it the U-shape previously described but additionally with a short side substantially parallel to the base 63 and fixed to the end of the branches 61 and 62. In this embodiment, the removable clip therefore encloses the whole of the perimeter of the keypad module.

Thus the keypad is fixed very reliably to the mobile terminal and this allows the terminal to be used in diverse positions with no risk of disconnection of the keypad.

The terminal has two portions: firstly the keypad module 40 and the clip 60 and secondly a functional core 70.

Figure 3:
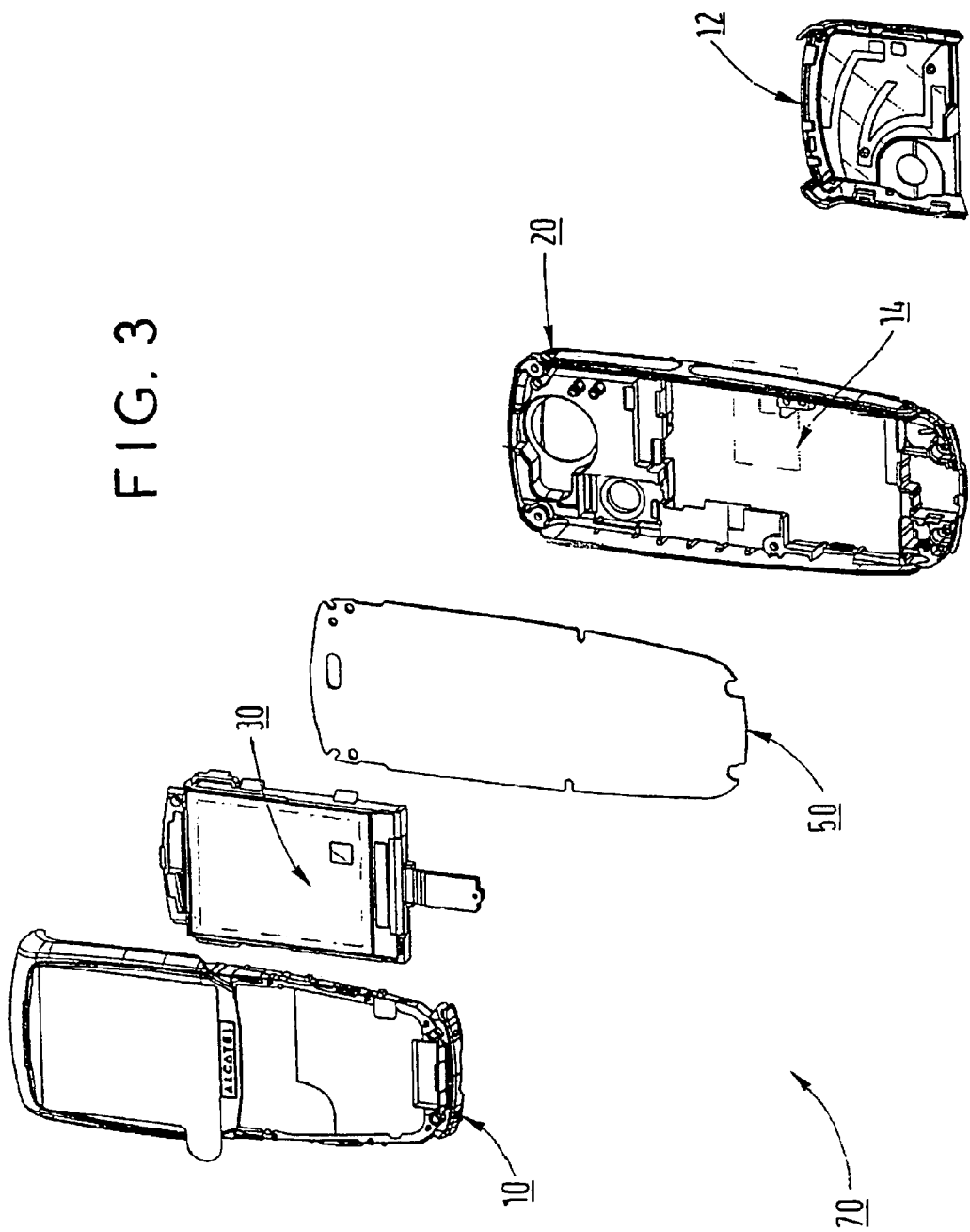
FIG. 3 is an exploded view of a functional core of the terminal of the invention.

The functional core 70 of the terminal, shown in the FIG. 3 exploded view, comprises in particular the front face 10 of the casing of the terminal, under which are located the display module 30, the printed circuit 50, the battery 14 and the antenna 12, and the rear face 20 of the casing of the terminal closes the functional core 70 at the rear.

When the user wishes to fix the keypad module 40 to the terminal, he places the keypad module 40 on the location 71 on the functional core 70 reserved for the keypad module 40 and then slides the clip 60 around the keypad module 40.

The clip 60 bears on a shoulder 41 at the perimeter of the keypad module 40.

Figure 4:
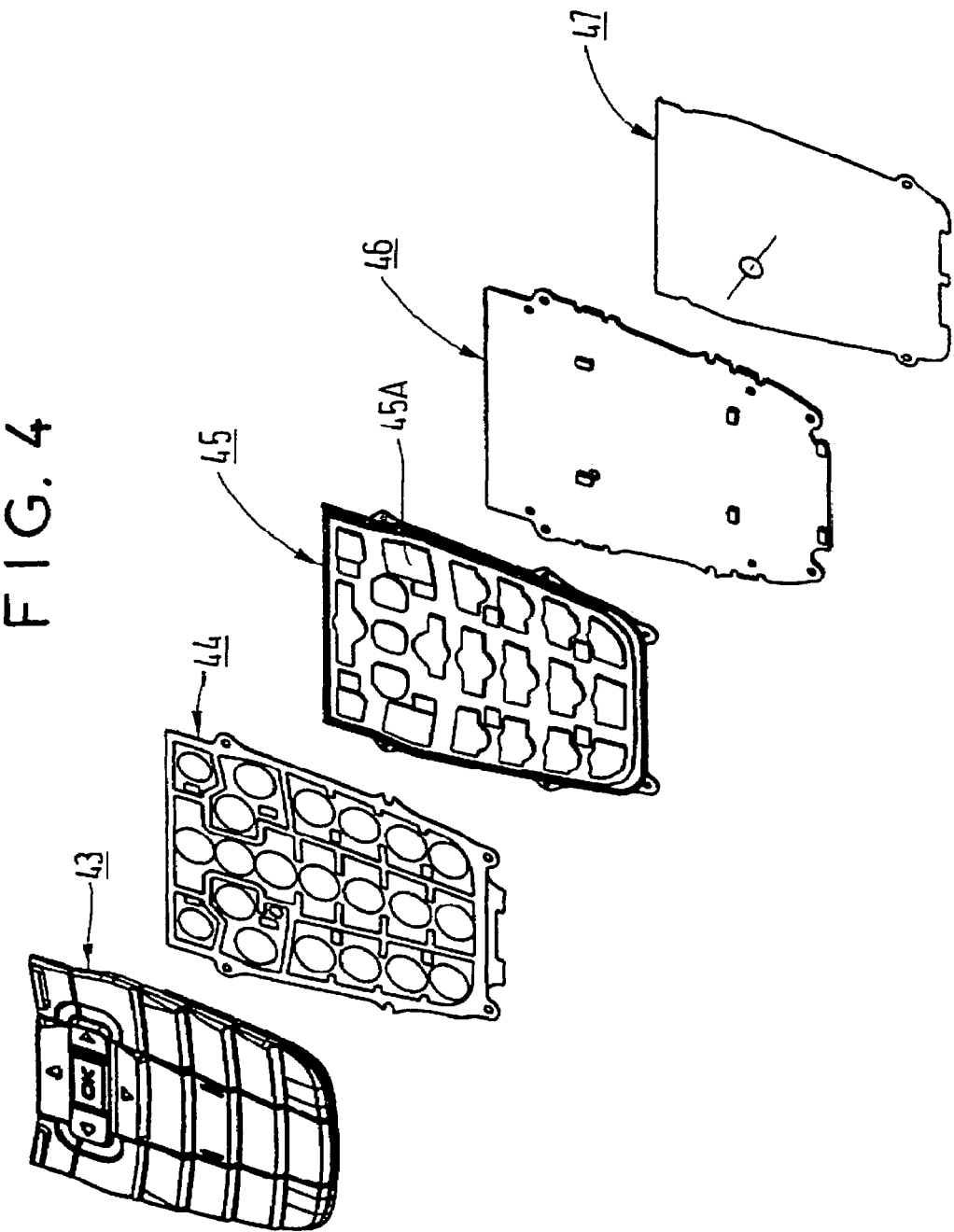
FIG. 4 is an exploded view of a keypad module of the terminal of the invention.

The keypad module 40, shown in the FIG. 4 exploded view, has a substantially parallelepipedal shape and comprises a tab 42 on one of its shorter sides.

The tab 42 could equally be on one of the other sides of the keypad module 40, or anywhere on the rear surface of the keypad module 40, i.e. the face of the keypad module 40 opposite the face carrying the keys.

This tab 42 comprises electrical connecting terminals that are brought into corresponding relationship with electrical connecting terminals of the connector 55 making the electrical connection of the keypad module 40 to the printed circuit 50.

The electrical connection between the keypad module 40 and the printed circuit 50 of the terminal is therefore made via the tab 42 and not over the whole surface of the keypad.

The electrical connection between the keypad module 40 and the printed circuit 50 of the terminal could be made without the assistance of the connector 55, for example, directly to connecting terminals on the printed circuit 50.

The tab 42 also provides means for securing the keypad module 40 to the front face 10.

The keypad module 40 also comprises a key membrane 43, possibly of plastic material, an elastomer layer 44, a plastic film 45 with metal cups 45a, a dedicated printed circuit 46 of the keypad 40, with light-emitting diodes, and an insulative plate 47.

The light-emitting diodes back-light the keypad module 40 of the terminal. They are electrically connected to the dedicated printed circuit 46 of the keypad 40.

The key membrane 43 is electrically connected to the dedicated printed circuit 46 of the keypad 40 by the metal cups 45a.

Because the keypad module 40 comprises a dedicated printed circuit 46, there is no direct electrical connection from each key to the printed circuit 50 of the terminal, which makes all possible keypad modules compatible with the user's terminal.

Figure 5:
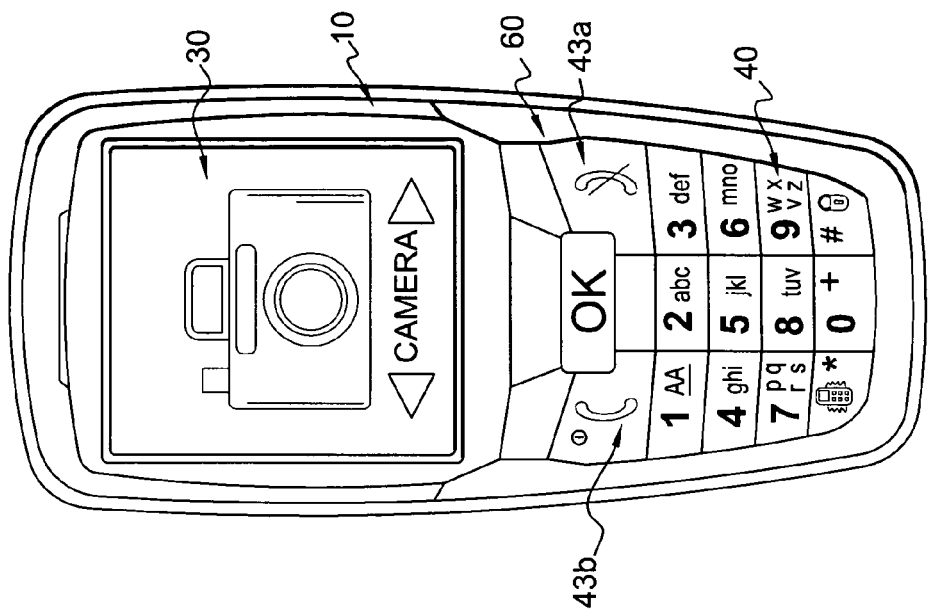
FIG. 5 shows the terminal of the invention with a first example of a keypad.
Figure 6:
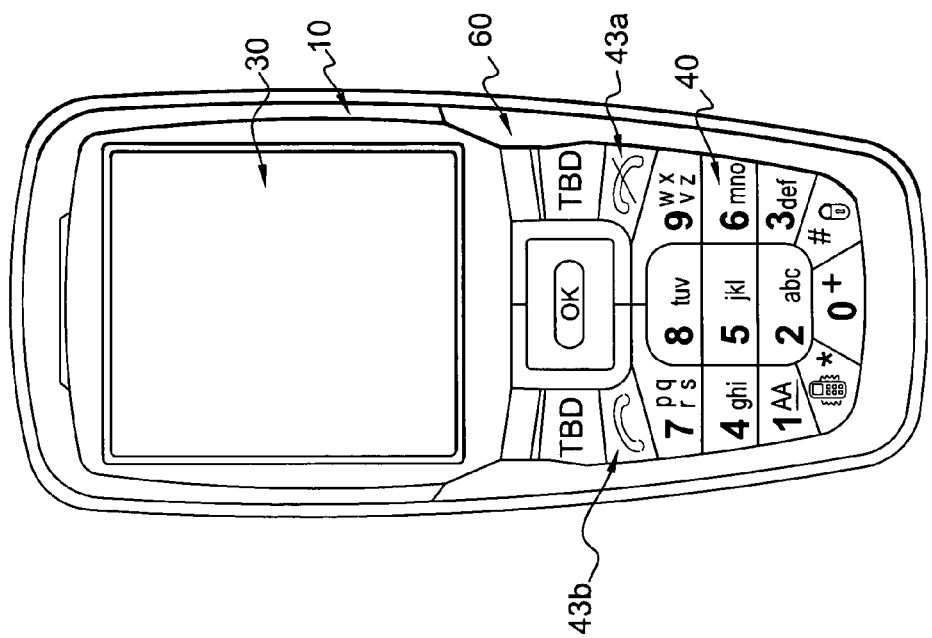
FIG. 6 shows the terminal of the invention with a second example of a keypad.

FIGS. 5 and 6 show two different types of keypad module 40 that may be connected to the same terminal.

The keypad module 40 shown in FIG. 5 comprises 21 keys and that shown in FIG. 6 comprises 23 keys. The 1, 2 and 3 keys have been interchanged with the 7, 8 and 9 keys between the two keypad modules 40. Some keys have different geometries between the two keypad modules 40, for example the "Hang Up" key 43a and the "Raise Handset" key 43b.

It would not be possible to apply two prior art front faces comprising keypads as different as this if there were a direct electrical connection from each key to the printed circuit 50 of the terminal.

Certain keys may equally be back-lit differently from one keypad module 40 to another, in which case the light-emitting diodes of the dedicated printed circuits 46 of the keypad 40 have different dispositions between the two keypad modules 40.

It is then possible to dispose diodes under certain keys and not under other keys if the latter cannot be back-lit because of their nature, for example if they are metallized.

In the prior art, the diodes are fitted once and for all during fabrication of the terminal. If a new keypad is fitted having metallized keys instead of transparent keys the diodes underlying the metallized keys continue to operate and consume power although they serve no purpose.

Thanks to the keypad module 40 of the invention, comprising a dedicated printed circuit 46 with light-emitting diodes, only the keys intended to be back-lit have an underlying light-emitting diode, thereby saving power. The compatibility with the user's terminal of all keypad modules with different geometries is still assured.

The previous embodiments relate to a terminal in which the front face 10 and the rear face 20 are substantially parallel to each other and each lie in a single plane. However, the invention applies equally to other types of terminal, for example terminals in which the front and rear faces (10, 20) are in two parts. The two parts of each face are articulated about a hinge common to the two faces, enabling the terminal to fold upon itself.

For example, the display module 30 is under one of the two parts of the front face 10 and the keypad module 40 of the invention is under the other part of the front face 10.

The terminal of the invention may be customized as much as possible on leaving the production line, and even by the user himself on purchasing the terminal.

Furthermore, the connections of the terminal may be tested without the keypad module 40, as the connector 55 provides access to them.

The functional core 70 of the terminal may be packaged with different kinds of keypad module 40, of different colors and with different kinds of clip 60.

Finally, the clips enable the operator of the user's mobile network to customize the terminal by applying its own name.

The invention claimed is:

1. A mobile telephone comprising:
    a casing having a front face and a rear face, the casing containing a printed circuit;
    a removable keypad module electrically connected to the printed circuit;
    wherein said front face defines a U-shaped removable clip that encloses the perimeter of the keypad module in order to lock the keypad module to said front face, the clip having a base and two lateral branches, whereby the keypad module is enclosed on at least three sides, the two lateral branches being made from an elastic material that is more elastic than the base.

2. The mobile telephone according to claim 1, wherein said clip bears on a shoulder at the perimeter of the keypad module.

3. The mobile telephone according to claim 1, wherein said clip includes lugs located near the free end of each lateral branch and adapted to locate in notches provided on the device.

4. The mobile telephone according to claim 1, wherein the clip has an open substantially rectangular shape whereby it encloses the keypad module over the whole of its perimeter.

5. The mobile telephone according to claim 1, wherein the keypad module includes a tab for making the electrical connection from the keypad module to the printed circuit of the electronic device.

6. The mobile telephone according to claim 5, further comprising an electrical connector for making the electrical connection from the keypad module to the printed circuit of the electronic device in conjunction with the tab.

7. The mobile telephone according to claim 5, wherein the tab also has the function of securing the keypad module to the front face of the electronic device.

8. The mobile telephone according to claim 1, wherein the keypad module includes a dedicated printed circuit and keys connected to the dedicated printed circuit of the keypad module.

9. Keypad module adapted to be fitted to the mobile telephone according to claim 1, said keypad module including a dedicated printed circuit, keys connected to the dedicated printed circuit, and a tab for making the electrical connection from the keypad module to the printed circuit and securing the keypad module to the front face of the electronic device.

* * * * *